United States Patent Office 3,269,523
Patented August 30, 1966

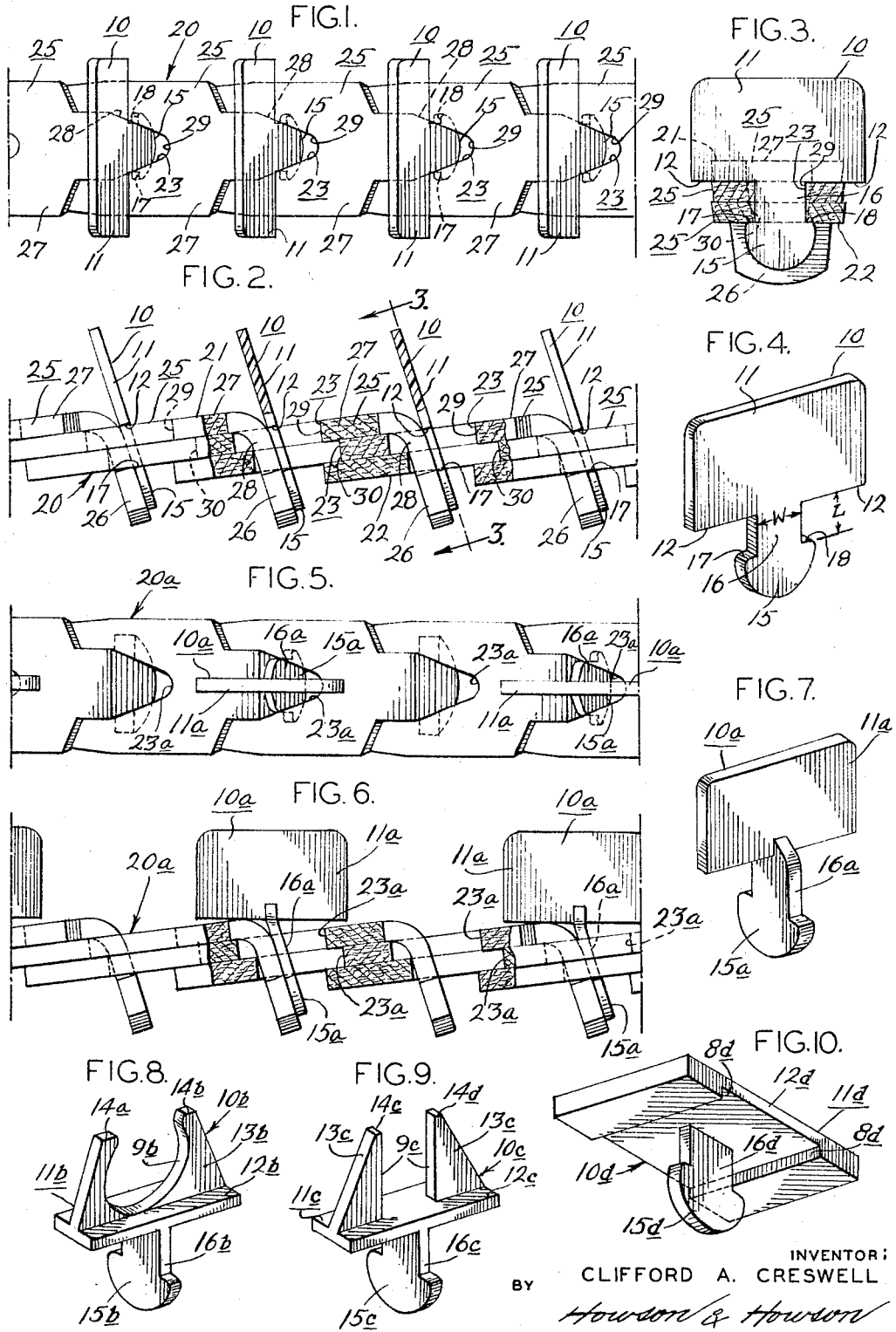

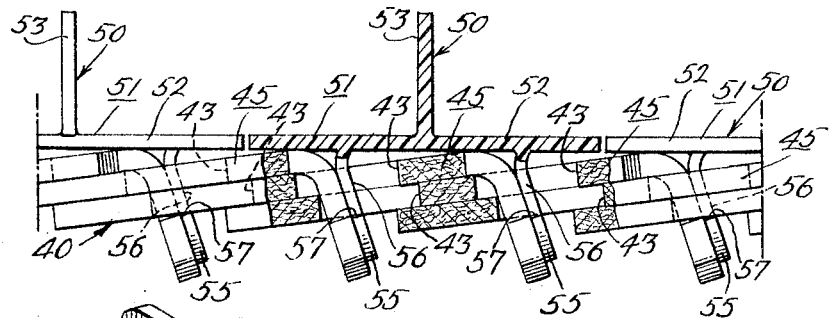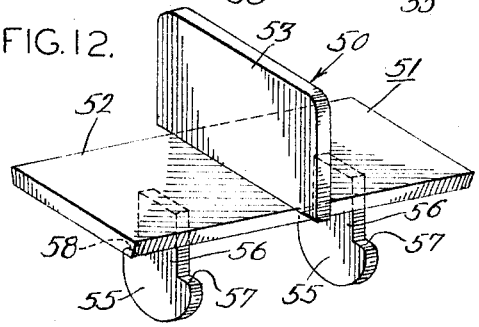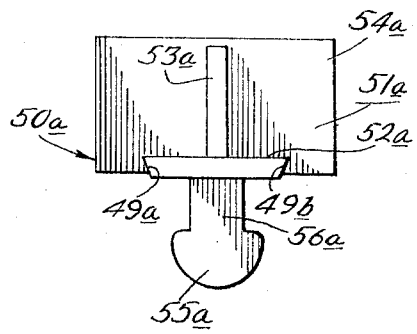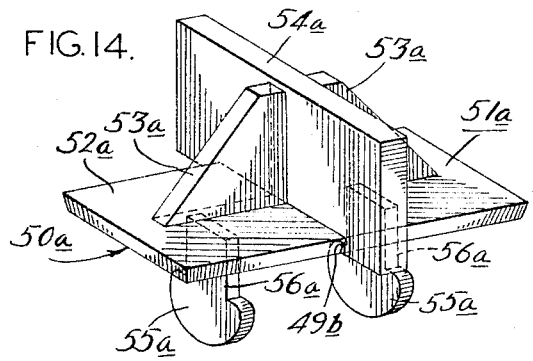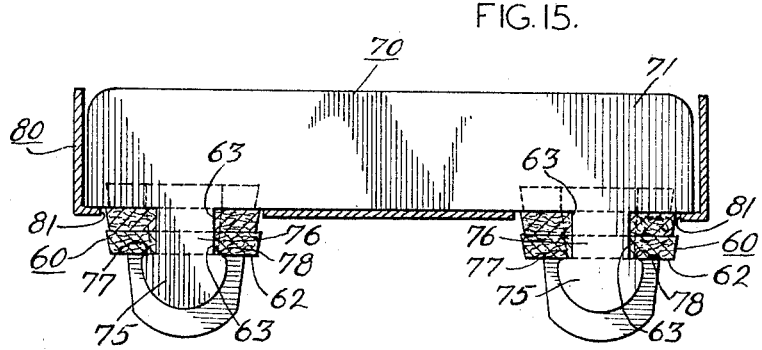

3,269,523
LINK BELT RIDERS
Clifford A. Creswell, Lancaster, Pa., assignor to The Arbee Corporation, Manheim, Pa., a corporation of Pennsylvania
Filed Jan. 19, 1965, Ser. No. 426,495
17 Claims. (Cl. 198—176)

The present invention relates to riders for link belts and more particularly, to attachments to be used in conjunction with link type belts for converting these type belts to permit conveying, pushing, scraping, and mechanical actuation of switches and the like.

The use of balata belting and flexible web conveyors is old in the art. Link type belts are also old in the art but have definite advantages as portions of the belt are replaceable, the belt is easily movable from one location to another, and the length of the belt may be easily changed in accordance with requirements existing at the location. Moreover, it is seldom thought that such belts are useful for other than drive purposes. However, it has been found advantageous and economical to enable the quick and easy conversion of a link type belt from solely a drive belt to include a conveyor belt. The present invention, therefore, relates to apparatus for insertion in link type belts so as to enable the belt to convey, push, scrape, or actuate switches and the like to carry out certain predetermined functions and operations.

In view of the above, it is an object of the present invention to provide an easily attachable and detachable rider to conventional link belts to enable the easy adaptation of the link type belt for pushing or scraping use.

Another object of the present invention is to provide an easily attachable and detachable rider for a link type belt to enable the belt to be used as a conveyor.

Still another object of the present invention is to provide an easily attachable rider for a link belt which permits the use of the belt to actuate switches and the like to carry out predetermined functions or operations.

Another object of the present invention is to provide riders which are easily connected to link type belts for quick conversion of the belt to serve any of the aforementioned functions, in an economical manner.

Another object of the invention is to provide a rider for a link type belt which rider is easily attachable to the belt without requiring the use of any auxiliary connecting equipment to aid in connecting the riders to the belt.

Still another object of the present invention is to provide a rider having the attributes heretofore set forth wherein the rider is particularly suitable for attachment to belts of the type set forth in the U.S. patent granted to Creswell, No. 3,154,961.

Other objects and a fuller understanding of the invention may be had by referring to the following description and claims taken in conjunction with the accompanying drawings in which:

FIG. 1 is a plan view of a link type belt having mounted thereon an embodiment of a rider constructed in accordance with the present invention;

FIG. 2 is a side elevation of the belt and rider as illustrated in FIG. 1 with portions thereof broken away to more clearly illustrate the manner in which the riders are connected to the belt;

FIG. 3 is a fragmentary view of the rider and belt taken along line 3—3 of FIG. 2;

FIG. 4 is a perspective view of the rider shown in FIGS. 1–3, removed from the belt;

FIG. 5 is a plan view of a link type belt having a variation of the embodiment of the rider shown in FIG. 4 and mounted on the belt;

FIG. 6 is a fragmentary side view of the belt and rider illustrated in FIG. 5;

FIG. 7 is a perspective view of the rider shown in FIGS. 5 and 6, removed from the belt;

FIGS. 8–10 are perspective views of variations of the rider embodiment illustrated in FIG. 4;

FIG. 11 is a side elevation of a link type belt mounting another embodiment of a rider, constructed in accordance with the present invention;

FIG. 12 is a perspective view of the embodiment of the rider illustrated in FIG. 11 removed from the belt;

FIG. 13 is a front elevation of a variation of the embodiment of the rider illustrated in FIG. 12;

FIG. 14 is a perspective view of the rider illustrated in FIG. 13; and

FIG. 15 is a fragmentary front elevation view of another embodiment of a rider mounted on a pair of link type belts.

Referring now to the drawings, as illustrated in FIGS. 1 and 4, a rider 10, comprising a body portion 11 connected to a toe 15 via a constricted neck 16, is mounted on a link belt 20. The belt 20, as illustrated in the drawings, has an upper and lower surface 21 and 22 respectively and comprises a plurality of stiff, yet resilient links connected together through apertures 23 extending from the upper portion through the belt to the lower portion 22 and connecting the riders to the belt in the apertures 23.

Although the link belt defined hereinafter is of the type set forth in U.S. Patent No. 3,154,961 of Creswell, it should be recognized at the outset that other link type belts having apertures with definite configurations such as hereinafter set forth, may be utilized in belts having riders in accordance with the present invention. The belt 20, in the present instance, comprises a plurality of superimposed links 25 joined together by integral fastening means. Each fastening means comprises a locking tab 26 joined to the body 27 of the link 25 through a constricted neck portion 28. As illustrated in FIG. 2, the locking tab 26 is spaced a sufficient distance from the longitudinally tapered body 27 of the link 25 to receive therebetween two of the links 25. The links 25 are provided with registering apertures 23 for receiving the locking tabs 26 and the neck 28 of preceding links 25 as they are assembled in superimposed relation. As illustrated in FIG. 2, in the present instance, each of the links 25 is provided with a forward aperture 29 and a trailing aperture 30.

When the links 25 are assembled in successive superimposed overlapping relation, the trailing aperture 30 is in registry with the forward aperture 29 of the next adjacent link, so that the locking tab 26 of the overlapping link first passes through the forward aperture 29 of the adjacent link and then through the trailing aperture 30 of the innermost link, and thereafter bears against the inner or lower surface 22 of the innermost link. For ease of assembly, both of the apertures 23 are longer in the axial direction than they are wide so that the locking tab 26 of the link 25 to be assembled in superimposed relation, when twisted so as to align axially with the apertures 23, will more easily pass therethrough. When the locking tab 26 is released from its twisted position, it aligns crosswise with the belt 20 in a position perpendicular to the longitudinal axis of the link 25 and since the width of the apertures 23 is less than the length, the locking tab 11 is unable to pass through the apertures and is locked in position against the lower surface 22 of the innermost link (see FIG. 2).

In accordance with the invention, the riders 10 are easily inserted into the belt through the apertures 23 but are securely held thereby to prevent inadvertent dislodgment of the riders from the belt. To this end, the neck 16 of the riders 10 has a width W equal to or less than the width of the apertures 23 at the intended point of entry of the rider through the belt 20, and an axial length L at least equal to the cross sectional thickness of the belt. To insure proper engagement of the riders in the belt, the toe portions of the riders have outwardly extending, rearwardly facing shoulders 17 and 18 extending from either side of the neck portion, in the present instance substantially perpendicular to the central axis of the neck 16 and adjacent thereto. As illustrated in FIG. 3, the toe 15 has a width less than the cross sectional width of the links at the apertures 23, and tapers forwardly away from the neck 16, in the present instance towards the central axis of the link, in order that the toe 15 may be easily inserted in the apertures 23 and may properly engage the lower surface 22 of the belt. As illustrated in the drawings, inadvertent pull through of the rider through the apertures 23 is prevented by an edge 12 of the body portion 11, adjacent the neck 16, bearing against the upper surface 21 of the belt 20.

The advantage of utilizing a belt 20 such as heretofore described is that the riders 10, connected thereto in a manner as has previously been described, tend to be supported by the integral locking tab 26 when the riders are in position. The reason for the natural support of the riders axially of the belt 20 is that as the locking tabs are passed through successive links and then terminate, their natural tendency when the belt is tensioned is to dispose themselves parallel to the link by flattening out. As may be seen in FIG. 2, as the belt is tensioned the locking tab 26 tends to move counterclockwise causing the frontal surface of the locking tab 26 to bear against the toe 15 thus providing axial rigidity for the riders 10.

The use of a rider such as illustrated in FIG. 4 may be as a carrier or conveyor wherein small articles are placed on the upper surface 21 of the belt 20 and carried by the riders to their intended position, or in the alternative as a scraper or pusher wherein the belt rides, for example, in a trough and it is desirable to move articles such as nuts and bolts along the trough from one point to another. In conjunction with the use, it should be recognized that it is not necessary to place riders in each of the registering apertures 23 but only in such positions as desired along the belt 20.

A variation of the rider form 10 illustrated in FIG. 4 may be seen in FIG. 7 wherein a rider 10a having a body portion 11a is connected through a neck 16a to a toe 15a. In this instance, the rider 10a may be utilized in a belt similar to that as heretofore described, in the present instance as illustrated in FIGS. 5 and 6, and designated 20a. As may be seen in FIGS. 5, 6, and 7, the body portion 11a of the rider 10a is oriented, so that when inserted into apertures 23a of the belt 20a, the body portion aligns along the longitudinal axis of the belt 20a. The intended use for a rider such as that illustrated in FIG. 7 would be as a pusher of small articles in, for example, troughs or the like.

Other variations of the rider embodiment shown in FIG. 4 are illustrated in FIGS. 8, 9, and 10. For example, in FIG. 8, a rider 10b having a body portion 11b is connected through a neck 16b to a toe 15b for insertion into a link type belt as heretofore described. As illustrated in FIG. 8, the body portion 11b of the rider 10b comprises a platform 12b and a carrier 13b, the platform assuming a position substantially parallel to the upper surface of a link type belt upon insertion of the rider in the belt. The carrier, as shown, is mounted on the platform and contains means thereon to grip articles which are to be conveyed. In the present instance, the carrier comprises a pair of spaced upstanding walls 14a and 14b and the gripping means includes arcuate confronting edge portions 9b of the walls 14a and 14b. Thus, if the walls 14a and 14b were constructed of a resilient material, such as hard rubber, the arcuate confronting edge portions 9b would enable gripping of small round objects such as glass rods and the like.

Another variation of the embodiment of the rider illustrated in FIG. 4 is shown in FIG. 9. In this embodiment, a rider 10c having a neck 16c connecting a toe 15c supports a body portion 11c, which in the present instance comprises a platform 12c and a carrier 13c. As in the embodiment illustrated in FIG. 8, the platform 12c assumes a position substantially parallel to the upper surface of a link type belt upon insertion of the rider in the belt. Additionally, in a manner similar to the rider previously described in FIG. 8, the carrier 13c comprises a pair of spaced upstanding walls 14c and 14d and contains means thereon, in the present instance upright edges 9c, to grip relatively small objects.

Another variation of the embodiment of the rider illustrated in FIG. 4 is illustrated in FIG. 10, which rider is designated 10d for purposes of identification. Similar to the riders as previously described, a body portion 11d, comprising in the present instance a platform 12d, is connected to a toe 15d via a neck 16d. In order to provide maximum lateral and longitudinal stability of the rider 10d, the lower portion of the platform 12d is preferably grooved and provided with inwardly facing and spaced shoulder portions 8d adapted to grip the edges of a link type belt. As illustrated, the platform 12d has an extended width so that it may carry bottles, cans or other articles thereon.

Many times it may be desirable to set up a conveyor line which will permit the carrying of larger items of heavier weight, which items may require an increase in the longitudinal stability of the riders and greater load carrying potential. Such a rider having greater lateral and longitudinal stability as well as greater load carrying capabilities is illustrated in FIGS. 11 and 12. As illustrated in FIG. 11, a link belt 40, comprising a plurality of links 45 and containing apertures 43, mounts thereon a rider 50. The belt 40 is similar to the belt 20 as previously described and possesses the same attributes as heretofore set forth. As illustrated in FIG. 12, and in accordance with the invention, this embodiment of the rider 50 has a body portion 51 connected to a pair of longitudinally spaced toes 55 via necks 56. In the present instance, the body portion 51 comprises a platform 52 having mounted thereon an upright carrier 53 to hold items placed on the platform 52.

As previously described with reference to the embodiment of the rider illustrated in FIGS. 4–10, each neck 56 of the riders 50 has a width equal to or less than the width of the aperture 23 and an axial length equal to or greater than the cross sectional thickness of the belt at the aperture. In addition, the toes 55 have outwardly extending, rearwardly facing shoulders 57 and 58 extending from either side of the neck portion, in the present instance, substantially perpendicular to the central axis of the neck 56 and adjacent thereto. In the present instance, the width of the toe 55 is less than the cross sectional width of the links at the apertures, the toe tapering forwardly away from the neck and towards the central axis thereof whereby upon insertion of the toe into the aperture 43, the shoulders 57 and 58 engage the lower surface of the belt while the platform 52 engages the upper surface of the belt.

A variation of the rider illustrated in FIG. 12 is shown in FIGS. 13 and 14 wherein a rider 50a having a body 51a is connected to a pair of spaced toes 55a via constricted necks 56a. In this variation, the body 51 comprises a platform 52a, upright bifurcated carriers 53a and an adapter 54a. As illustrated in FIG. 14, the adapter 54a seats and is engaged by the bifurcated carrier 53a, and is provided with a groove having inwardly facing shoulders 49a and 49b to engage the platform 52a and be held thereby. In this manner, the rider 50a is conveniently divided into four compartments which will permit the conveying of small items which it is desirable to keep separate.

In certain instances where it is desirable to move large cumbersome items from one point to another, it may be desirable to run a plurality of belts in spaced but axially parallel relation and provide a pusher or conveyor, such as has previously been described, thereon. To this end, as illustrated in FIG. 15, a rider 70 having an upright body portion 71, is connected to a pair of belts 60, such as heretofore described, by a pair of laterally spaced toes 75 connected to the body of the rider 70 via necks 76 extending through apertures 63 in the belts 60. As illustrated in FIG. 15, the rider 70 may be positioned in a chute 80 having suitable openings 81 to receive the belt 60 therein. As before, the toes 75 are provided with shoulders 77 and 78 to engage the lower surface 62 of the belt 60.

A number of other uses may be contemplated in conjunction with the riders of the present invention. For example, a single rider having a set height could be positioned on a belt to cause actuation of a switch whereby certain predetermined functions are carried out at the time when the rider passes the switch. Further, as may be visualized, the body portions of the riders may be located at various vertical heights to give selective pickup of items of various sizes in, for example, chutes. Of course, many other uses for the riders of the present invention and many shapes and forms may be visualized.

It should be appreciated that the riders of the present invention may be composed of a variety of materials such as moldable thermoplastic, for example, nylon or vinyl or thermosetting plastics such as phenolics, hard rubber, etc., or any other material which is necessary to meet existing or contemplated plant conditions.

In summary, the present invention provides easily attachable riders for link type belts, which riders have a variety of uses. Thus although the riders heretofore described have particular and preferable application to a link belt as hereinabove set forth, other link belts possessing the necessary features as above described, may be utilized.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. In a link belt having an upper and lower surface and comprising a plurality of stiff yet resilient links connected together to form said belt, at least some of said lengths having an aperture therein extending from the upper surface through said belt to said lower surface; at least one rider for connection to said belt in one of said apertures, said rider having a body portion and a toe portion connected to said body by a neck portion, said neck having a width equal to or less than the width of said aperture and an axial length equal to or greater than the thickness of said belt, said toe portion having an outwardly extending, rearwardly facing shoulder extending from either side of said neck portion and adjacent thereto, said toe having a width less than the cross sectional width of said links at said apertures, said toe tapering forwardly away from said neck and toward the central axis of said neck whereby upon insertion of said toe into said aperture said shoulders engage said lower surface of said belt and said body portion engages the upper surface of said belt.

2. In a link belt in accordance with claim 1, wherein said body portion of said rider assumes an upright position upon insertion of said rider in said belt.

3. In a link belt in accordance with claim 1, wherein said body portion of said rider comprises a platform, said platform assuming positions substantially parallel to the upper surface of said belt upon insertion of said rider in said belt.

4. In a link belt in accordance with claim 3, wherein said body portion also includes a carrier mounted on said platform, said carrier having means thereon to grip articles which are to be conveyed thereby.

5. In a link belt in accordance with claim 1, wherein said toe of said rider, when inserted in said belt, is substantially perpendicular to the longitudinal axis of said belt.

6. In a link belt in accordance with claim 5, including a second toe connected to said body by a neck portion, said neck having a width equal to or less than the width of said aperture and an axial length equal to or greater than the thickness of said belt, said second toe portion having an outwardly extending rearwardly facing shoulder extending from either side of said neck portion and adjacent thereto.

7. In a link belt in accordance with claim 6 wherein said first and second neck are aligned longitudinally of said belt.

8. In a link belt in accordance with claim 6, wherein said toes are aligned laterally of the longitudinal axis of said belt.

9. A rider for an endless belt, said belt comprising a plurality of links arranged in superimposed successive overlapping relation, each of said links having at least one aperture and at least one integral fastening means, said integral fastening means comprising a locking tab and a constricted neck portion at one end of said link, each of said integral fastening means composed of the same material as the link and extending through the aperture in the succeeding link to secure said plurality of links together in overlapping relation to thereby form an endless belt, at least one rider connected to said belt in one of said apertures, said rider having a body portion and a toe portion connected to said body by a neck portion, said neck having a width equal to or less than the width of said aperture and an axial length equal to or greater than the thickness of said belt, said toe portion having an outwardly extending, rearwardly facing shoulder extending from either side of said neck portion and adjacent thereto, said toe having a width less than the cross sectional width of said links at said apertures, and tapering forwardly away from said neck and towards the central axis of said neck whereby upon insertion of said toe into said aperture, said shoulders engage said lower surface of said belt and said body portion engages the upper surface of said belt.

10. A rider for an endless belt, said belt comprising a plurality of links arranged in superimposed successive overlapping relation, each of said links having a body portion, an integral fastening means comprising a constricted neck portion and a locking tab connected to said body portion through said neck portion and integral therewith, said body portion having at least two apertures longitudinally aligned with said integral fastening means, said restricted neck portion extending through the forward aperture in the succeeding link, the trailing aperture in the next succeeding link and terminating thereafter in said locking tab securing said plurality of links together in overlapping relation, at least one rider connected to said belt in one of said apertures, said rider having a body portion and a toe portion connected to said body by a neck portion, said neck having a width equal to or less than the width of said aperture and an axial length equal to or greater than the thickness of said belt, said toe portion having an outwardly extending, rearwardly facing shoulder extending from either side of said neck portion and adjacent thereto, said toe having a width less than the cross sectional width of said links and said apertures, said toe tapering forwardly away from said neck and toward the central axis of said neck whereby upon insertion of said toe into said aperture said shoulders engage said lower surface of said belt and said body portion engages the upper surface of said belt.

11. A rider in accordance with claim 10, wherein said body portion of said rider assumes an upright position upon insertion of said toe into said belt.

12. A rider in accordance with claim 10, wherein said body portion of said rider comprises a platform, said platform assuming a position substantially parallel to the upper surface of said belt upon insertion of said toe into said belt.

13. A rider in accordance with claim 12, wherein said body portion also includes a carrier mounted on said platform, said carrier having means thereon to grip articles which are to be conveyed thereby.

14. A rider in accordance with claim 10 wherein said toe of said rider, when inserted in said belt, lies substantially perpendicular to the longitudinal axis of said belt.

15. A rider in accordance with claim 14, including a second toe connected to said body by a neck portion, said neck having a width equal to or less than the width of said aperture and an axial length equal to or greater than the thickness of said belt, said second toe portion having an outwardly extending rearwardly facing shoulder extending from either side of said neck portion and adjacent thereto.

16. A rider in accordance with claim 15 wherein said first and second necks of said rider are aligned longitudinally of said belt.

17. A rider in accordance with claim 15 wherein said toes are aligned laterally of the longitudinal axis of said belt.

References Cited by the Examiner

UNITED STATES PATENTS

| | | | |
|---|---|---|---|
| 2,955,700 | 10/1960 | Badger | 198—189 |
| 3,055,488 | 9/1962 | Stone | 198—198 |
| 3,154,961 | 11/1964 | Creswell | 74—234 |

EVON C. BLUNK, *Primary Examiner.*

R. E. KRISHER, *Assistant Examiner.*